Dec. 22, 1931.  J. L. ORTNER  1,837,578
JOURNAL BEARING
Filed April 23, 1930
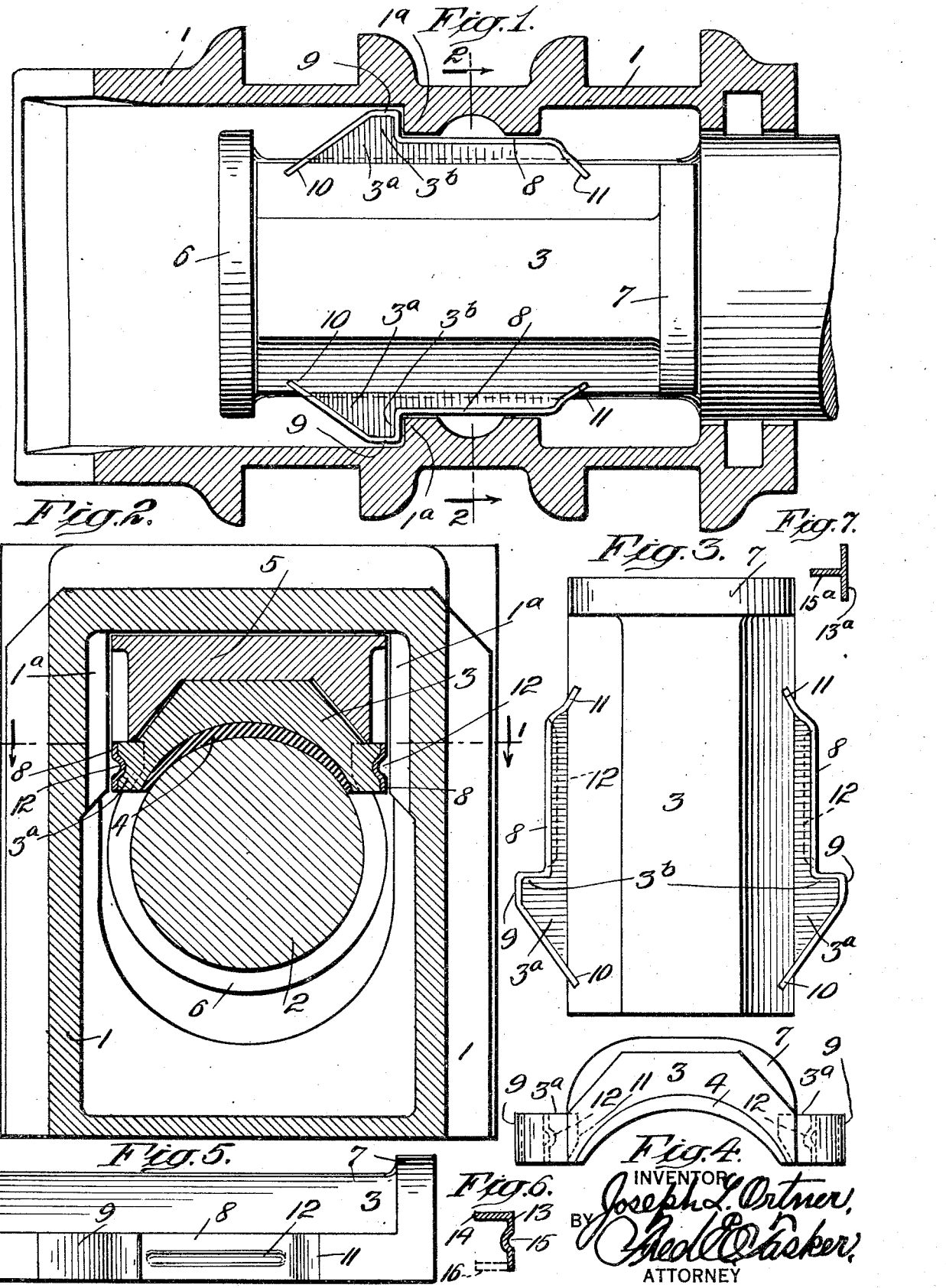

Patented Dec. 22, 1931

1,837,578

UNITED STATES PATENT OFFICE

JOSEPH L. ORTNER, OF BUFFALO, NEW YORK

JOURNAL BEARING

Application filed April 23, 1930. Serial No. 446,451.

My present invention relates to certain new and useful improvements in car journal bearings used in the journal boxes of railway and similar cars or rolling stock; and it consists essentially in means for reinforcing the bearings so as to strengthen them and increase their resistance to wear and durability, in order to promote economy and efficiency in construction, use and operation.

To this end therefore, and with many collateral advantages in view, the invention may be said to consist essentially in the construction, combination, and arrangement of parts, and numerous details and peculiarities of the same, substantially as will be hereinafter described and claimed.

In the accompanying drawings illustrating my invention:

Figure 1 is a horizontal sectional plan view of a journal box and the enclosed journal and other parts, taken on the line 1, 1, of Figure 2, the same indicating the details of my improved reinforced journal bearing.

Figure 2 is an enlarged cross section of the same, on the line 2, 2, of Figure 1.

Figure 3 is a detailed plan view of the improved reinforced journal bearing when viewed alone removed from its box.

Figure 4 is an end elevation of the same.

Figure 5 is a side view of the same.

Figure 6 is a cross section of a modified form of the supplemental lateral steel wearing plate, in the form of an angle or channel piece, and Figure 7 is a cross-section of another modified form of the same.

Like characters of reference denote like parts in all the different figures of the drawings.

1 denotes a car journal box, of any ordinary form and dimensions. The main portion is shown in section, but the hinged outside cover which is usually at the left hand is omitted. The waste packing with which the box is usually filled around the journal is not indicated as it is unnecessary to show it here. In the box 1 is the axle journal 2, which has at the outer end a collar 6. Above the journal 2 within box 1 is the horizontal brass bearing piece 3, between which and the journal 2 is a Babbitt packing piece 4, while surmounting the bearing 3 on the crown thereof is a wedge 5 of the usual type. The interior wall of the box 1 is formed with oppositely located vertical lugs or projections 1ª near the top, against which projecting lateral members on the bearing 3 may loosely contact to keep the bearing in its proper position within the box 1.

The brass bearing plate or member 3 is shown in detail in Figures 3, 4, and 5. Its under side is concave, or more or less semicircular, while its upper side is angular to correspond with the recessed side of the wedge 5 that fits over it; and the rear or inner end of bearing 3 is flanged at 7 to provide an abutment against which the inner end of wedge 5 may strike so as to keep the wedge in proper position. This bearing 3 is provided on its opposite sides with horizontal projecting lateral ledges or flanges 3ª.

These flanges 3ª are of greater or less thickness and of a length equal to a part of the length of the bearing 3, said lateral flanges 3ª being cast integral with the bearing 3, and having an angular outer edge that provides a shoulder 3ᵇ that strikes against the lugs 1ª on the inner wall of box 1, so that in the revolution of the journal 2 in its bearing 3 and the consequent movement of the bearing 3, the latter will not become displaced from its true and correct position in the box, it being noted moreover that the longitudinal edges of the flanges 3ª have a bearing and wearing edge against the lugs 1ª to guard against too great lateral oscillation of the bearing 3 in running and keep the bearing in its proper place between the sides of the journal box.

As the bearing 3 is generally of brass or some equivalent material, and as the edges and the shoulders on the lateral flanges 3ª are constantly rubbing against the adjacent lugs or other interior members of the box 1, said brass edges and parts will wear away in the course of time so that the bearing will become too loosely placed and a new brass will have to be substituted. This happens often, depending upon the amount of the running of the car, and such renewal of parts obviously involves much expense. The advantages in the use of brass as a material are so great that it is not easily dilspensed with in favor of a harder metal for the entire body construction, and therefore in lieu of such bodily change of metal I have devised my within improved combination whereby I attain all the advantages of the softer brass body and a hard metal wearing surface.

Therefore in order to attain the object in view with economy and efficiency I have found it of practical value to cover the lateral flanges 3ª with a thin veneer or reinforcement of steel or other hard metal which will withstand a much greater amount of wear than brass edges, without detracting in any respect from the value of the bearing in its relation to the journal.

The auxiliary covering members for the flanges 3ª consist for example of thin narrow strips of metal 8, as steel, attached to the outer vertical faces of the flanges 3ª and closely united to said edges throughout their entire length so as to form a thin indurated wearing edge, partaking of the form of the edges of the integral flanges 3ª including the shoulders 3ᵇ. The strips 8 thus placed and shaped are seen in edge view in Figures 1 and 3, in side view in Figure 5 and in section in Figure 2. Any hard metal that will stand great wear may be used to make these veneerings or faces, but I preferably employ steel, or spring steel, or iron, but reserve the liberty of substituting any other hard metal instead.

These steel faces 8 are placed closely against the edges of the flanges 3ª, that is to say they are so placed that when the brass bearing 3 is cast the faces 8 will be cast thereon or thereto, each with one end 11 embedded in the brass at one end of the flange 3ª, its bend 9 closely surrounding the shoulder 3ᵇ, and its other end 10 embedded firmly in the body of the brass near its outer end. Further, the main straight length of each steel plate 8 is corrugated or struck out to form a longitudinal rib 12 which seats itself in a corresponding groove in the brass; and thus in several ways the steel pieces are securely fastened to the brass; and further it will be seen that they may be brazed or shrunk on solid blocks of brass or otherwise fastened thereto.

I do not wish to be limited to the use of metallic strips of the same width as the edges of the lateral flanges on the bearing, like strips 8, but many and various other forms of strips or plates may be similarly attached to or cast upon or with said flanges. Thus in Figures 6 and 7 I suggest some different forms for these wearing plates. The plate 13, as in Figure 6, may have a right angled flange 14 as well as a rib 15, so that this form indicates how an angle bar may be utilized as a wearing strip on each flange 3ª, the vertical member 13 of the angle bar being attached like the piece 8 to the outer edge of the integral flange, while the horizontal flange 14 of the angle bar will be secured upon the top face of the integral flange 3ª. Further a channel bar or beam or piece may be used, as indicated in Figure 6 where the vertical strip 13 is provided not only with the top flange 14 but also with the bottom flange 16, shown in dotted lines, and when a channel piece is fixed upon the bearing flange 3ª its member 14 will be on the top and its member 16 will be on the bottom so that the bearing flange will be held between the parts 14 and 16 and in the channel. Another form shown in Figure 7 consists of a T bar, in which the vertical strip 13ª is provided with a central longitudinal integral flange 15ª that is cast in the brass flange 3ª when the brass is moulded or shaped into its form to serve its purpose. While I have shown these few forms in order to illustrate how certain well known shapes of angle bars, T bars, channel bars, and the like may be utilized, I am not restricted thereto, but claim that various other forms of hard wearing plate may be used instead if desired, and I am not limited at all to the shape or character of the plate.

The employment of hard metal wearing plates on the sides of the brass bearing 3 gains numerous important advantages. Where a hard plate, as 8, is attached over the flange 3ª and its shoulder 3ᵇ any serious breaking, fracture, and distortion of the bearing at the points where effective contact is made with the lugs 1ª is prevented. In the movement of the parts which involves lateral wear on the journal and the brass bearing there results an axial thrust against lugs 1ª when the car is rounding curves, which damages and wears out the parts, cracking, straining and injuring the bearing. And further the lateral strain of the side flanges against the inner faces of the lugs 1ª in the application of the brakes causes wear in the brass, and causes a distortion that makes the lining and Babbitt packing to become loose; and often also there is a pinching of the brass at this point that reduces the radial curve of the brass, by drawing the side portions of the brass inwardly, and thus making the latter unfit for service, and ruining the Babbitt metal, and causing a hot box with all the objections and dangers arising therefrom.

Many changes in the exact details may be made without departing from the invention. When a journal bearing of the class described is provided with external faces or edges of hard wearing metal or material, of the proper shape and implanted thereon or therewith in the proper manner, much better results in the continuous and efficient operation of the journal box will be had and the danger of dislocation and breakage in the various parts will be minimized and many useful and important advantages gained, as will appear to those handling these bearings in their practical operation.

What I claim is:

1. In a journal box, a bearing having lateral flanges, means for surfacing said flanges with a harder material than the bearing so as to resist wear, said surfaces being located in close proximity to the inner walls of the journal box with which they have a contactual relation, and said surfaces being closely united with and securely fastened throughout their length to the bearing flanges and having their ends embedded in the bearing.

2. In a journal bearing, a brass body having lateral flanges in combination with wearing strips of harder material on said flanges, said strips having their ends embedded in the brass bearing so that they may be secured firmly in position on the flanges.

3. In a journal bearing, a brass body having lateral flanges provided with shoulders, in combination with steel strips arranged on said flanges to provide wearing faces for the same, said strips being embedded at their ends in the brass when it is cast, and said strips lying over the shoulders and having their straight lengths indented to engage grooves in the brass.

4. A journal box having interior flanges to serve as stops, in combination with a concave brass bearing that receives the journal, said bearing having lateral flanges, and steel strips arranged on said flanges to provide wearing faces for the same where they contact with the internal box flanges, said strips covering the shoulders of the flanges and having their ends embedded in the brass.

5. A journal box having internal flanges therein, in combination with a concave brass body for holding the journal, said body having lateral shoulders adapted to engage the flanges on the interior of the box, and steel faces covering said shoulders and embedded at their ends in the brass so that the wearing parts of the journal may be relatively harder than the brass so that wear in the movement of the parts against the interior wall of the journal box may be resisted.

In testimony whereof I hereunto affix my signature.

JOSEPH L. ORTNER.